United States Patent [19]

Gould

[11] Patent Number: 4,624,446
[45] Date of Patent: Nov. 25, 1986

[54] GROUND SUPPORTED LEVELER FOR VEHICLE DOCKAGE

[75] Inventor: Ronald R. Gould, Elk Grove Village, Ill.

[73] Assignee: Advance Lifts, Inc., St. Charles, Ill.

[21] Appl. No.: 754,654

[22] Filed: Jul. 15, 1985

[51] Int. Cl.$^4$ .............................................. E02C 3/00
[52] U.S. Cl. ....................................................... 254/88
[58] Field of Search ............... 254/88, 89 H; 14/69.5, 14/71.3, 71.5, 71.7; 414/678

[56] References Cited

U.S. PATENT DOCUMENTS

| | | | |
|---|---|---|---|
| 2,607,937 | 8/1952 | Stone | 14/69.5 |
| 3,027,580 | 4/1962 | Haack | 14/69.5 |
| 3,252,590 | 5/1966 | Nielsen | 414/678 |
| 3,995,342 | 12/1976 | Wiener | 14/71.3 |

FOREIGN PATENT DOCUMENTS

| | | | |
|---|---|---|---|
| 598028 | 12/1925 | France | 414/678 |
| 1499741 | 2/1978 | United Kingdom | 14/69.5 |
| 998323 | 12/1979 | U.S.S.R. | 254/88 |

*Primary Examiner*—Robert C. Watson
*Attorney, Agent, or Firm*—Gary, Juettner & Pyle

[57] ABSTRACT

A lift is described for raising the rear end of a trailer at a dock. The lift is entirely mounted above ground level and includes a reinforced platform having a rigid U-shaped beam support assembly secured at the forward end of the platform. The support assembly includes a pair of upstanding legs, which contain hydraulic cylinders for raising and lowering one end of the platform.

16 Claims, 7 Drawing Figures

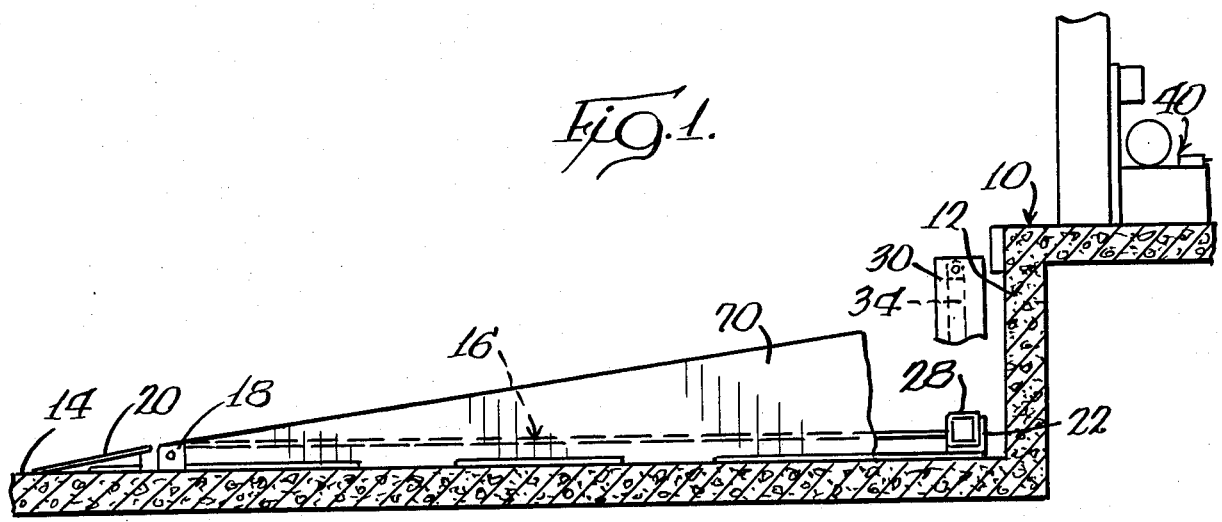
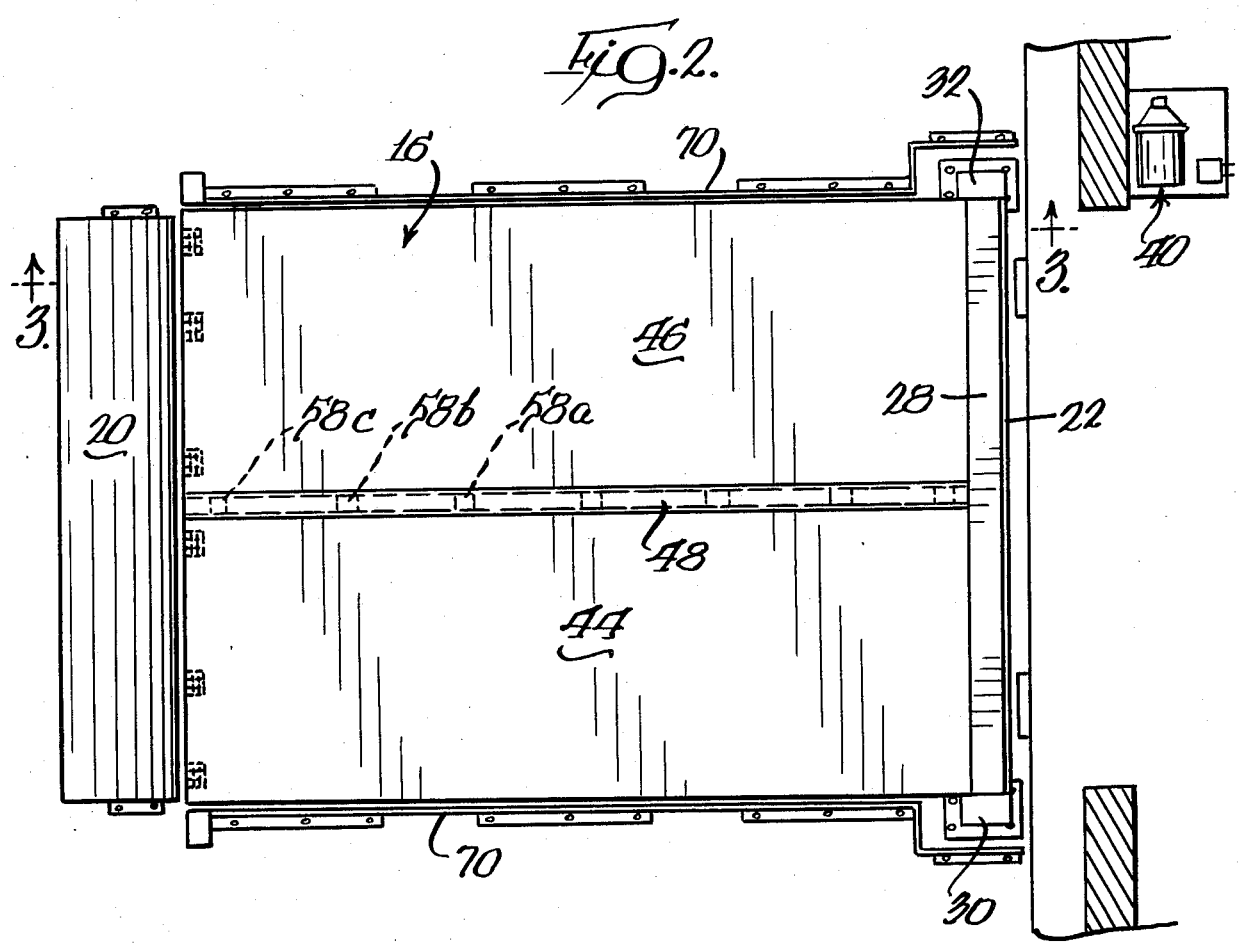

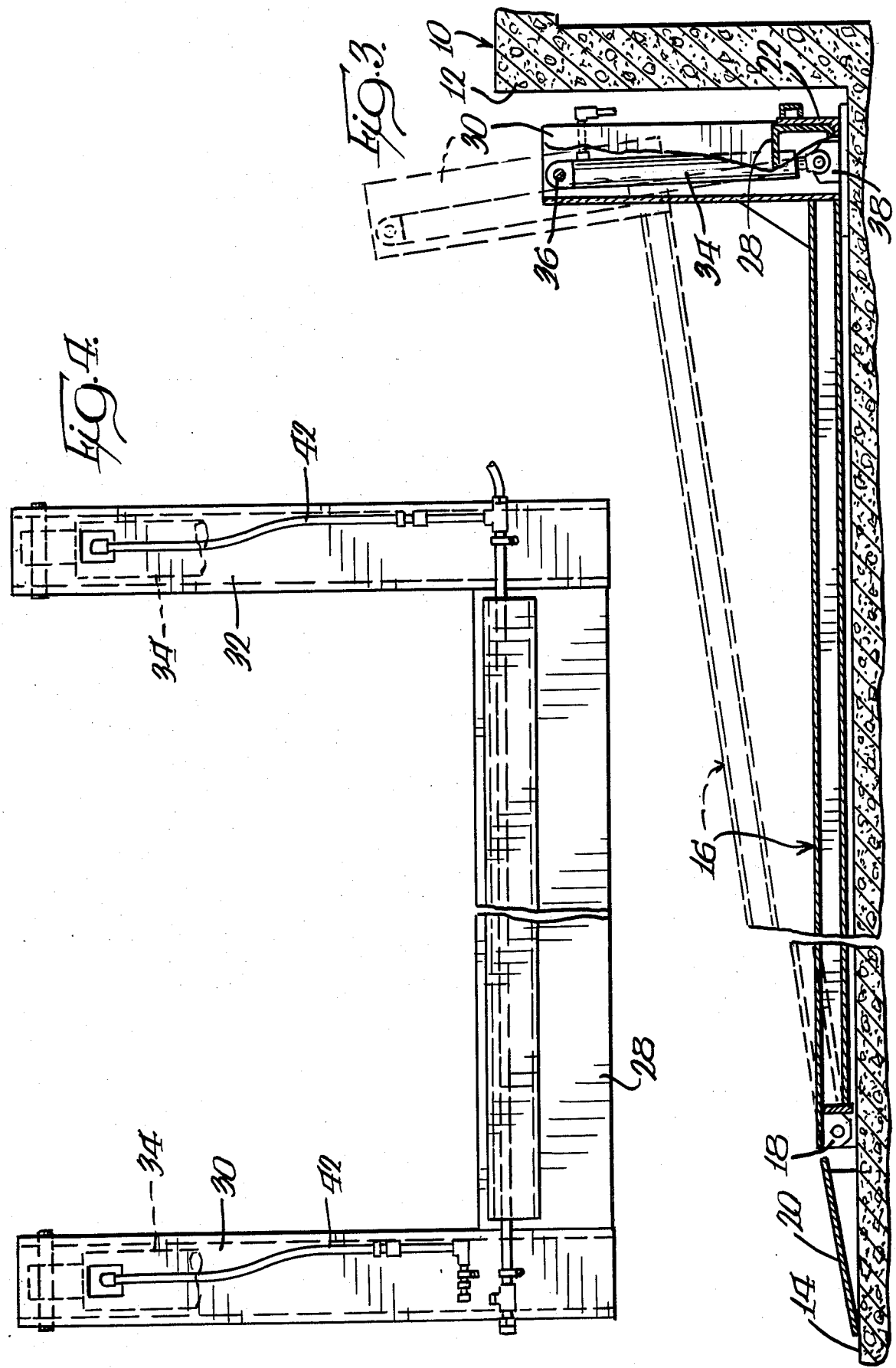

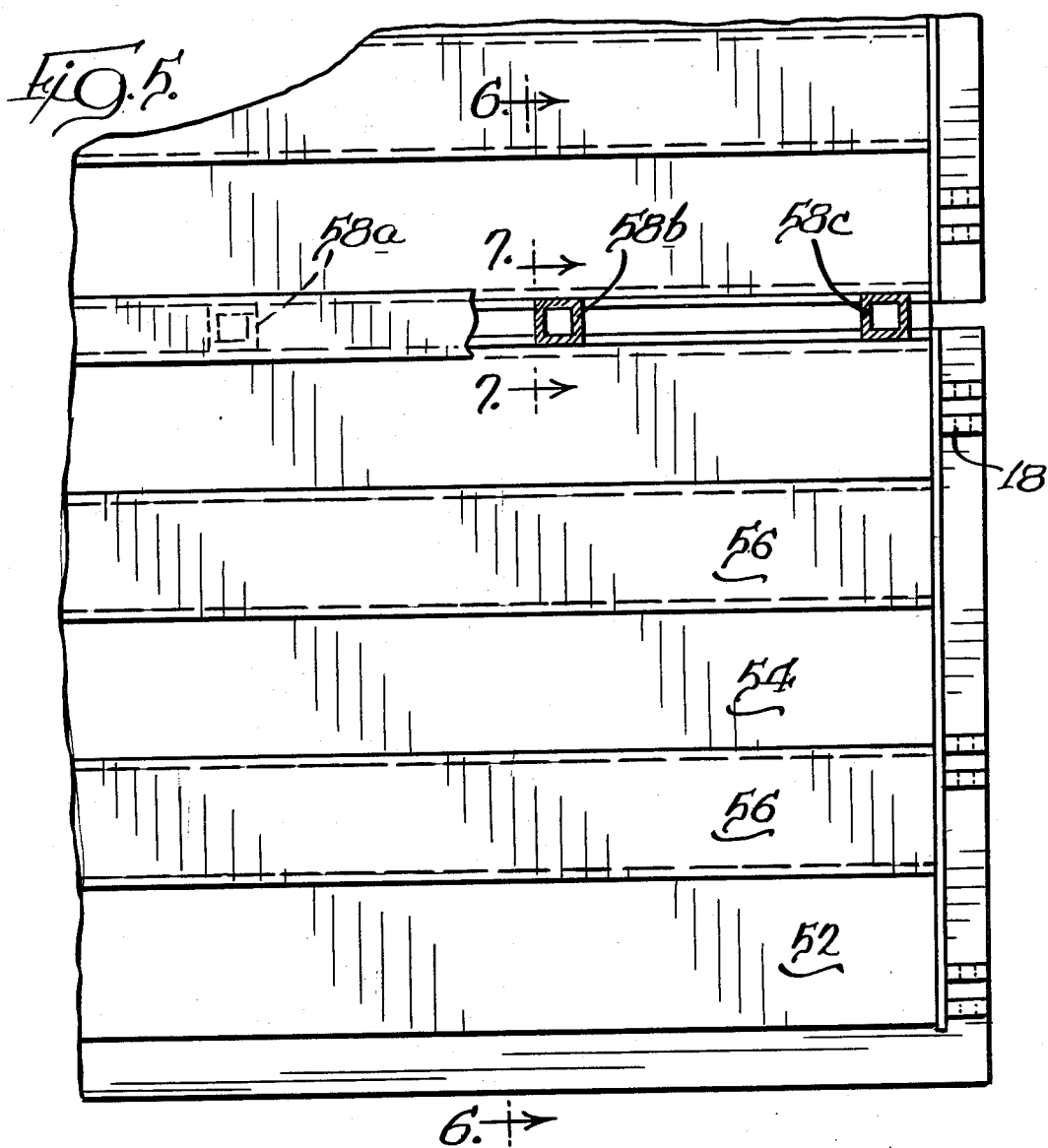
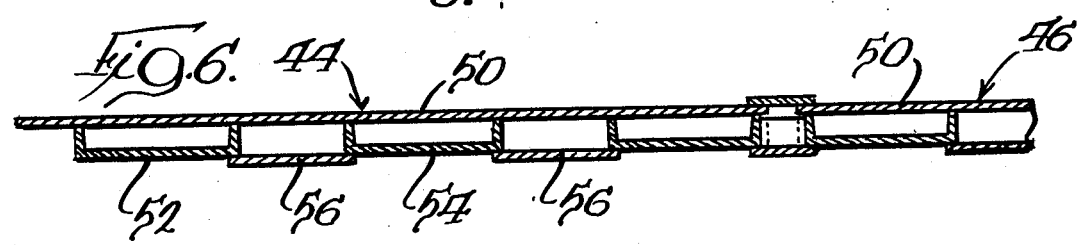
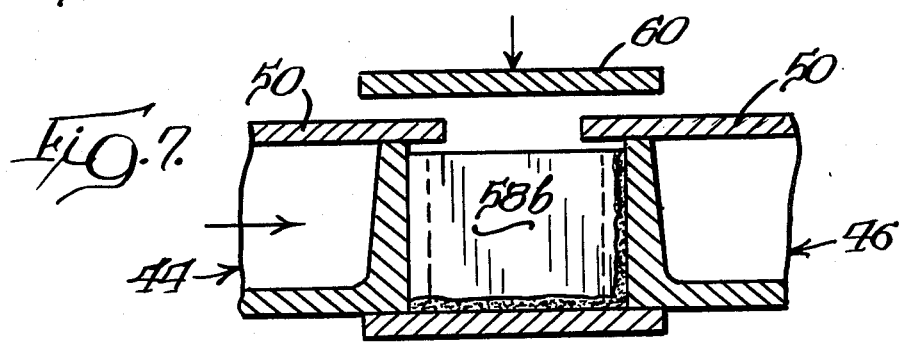

GROUND SUPPORTED LEVELER FOR VEHICLE DOCKAGE

BACKGROUND OF THE INVENTION

This invention relates to a ground engaging device for raising the rear end of a truck trailer during docking, and more particularly to a lifting device which is movable from a flat position on the ground to an inclined position. The device operates to elevate the bed of a trailer to the level of a dock to facilitate loading and unloading of cargo.

In order to load and unload a trailer, it is normally backed up against a raised dock. In many cases, the bed of the trailer is considerably lower than the level of the dock. In some cases, it is possible to use a platform extending from the dock to the bed of the truck, provided that the angle of inclination is not too severe. If the bed of the truck is especially low, however, a separate lift is employed beneath the rear wheels of the truck.

Present day truck lifts are designed to be level with the ground and comprise a hydraulically operated platform. The rear wheels of the trailer are backed onto the platform, and the platform is then inclined upwardly to lift the rear end of the trailer.

All prior and current lifts of the foregoing nature require a pit to be excavated beneath the lift and lined with concrete. The use of a pit has been considered essential for several reasons. First, the power cylinders and other operative components are contained in the pit. Second, the construction of the platform requires substantial reinforcement to support the heavy weights being lifted, i.e., up to 50,000 pounds. The reinforcing beams for the platform occupy considerable thickness, which is accommodated by the pit when the lift is in a lowered position.

There are many serious drawbacks with truck lifts which require use of a pit. The cost of the excavation, concrete work, piping, etc., is very high and may contribute up to 50 percent of the cost of installation. Installation of a pit at an existing site may be extremely difficult or impossible. Moreover, the installation is considered to be permanent, in that the lift equipment cannot be moved or relocated without construction of a new pit.

All of the foregoing problems, together with the use of lower trailer beds, have created the need for a lift which is more adaptable than those currently available in the art.

SUMMARY OF THE INVENTION

Accordingly, a major object of the present invention is to provide a lift which can be mounted on existing pavement and does not require the excavation of a pit to accommodate the working and structural components of the lift.

Another object is to provide a ground mounted lift in which the working or power components may be positioned above ground level.

An additional object is to provide an integrated reinforcing system for the lifting platform having a minimal thickness to allow the lift to be mounted substantially flush with the ground.

The foregoing objects are attained by the provision of a platform in the form of a sandwich structure. The rear of the platform is reinforced by a low profile U-shaped beam having a pair of upstanding hollow legs. Hydraulic cylinders are disposed in the legs and act to raise the rear end of the platform on an incline. The other end of the platform is hinged to the ground, and a short ramp is provided to allow the rear wheels of the trailer to be driven onto the platform.

By providing a uniquely reinforced platform of minimal thickness, it is possible to eliminate the need for a pit and the attendant expense. The lift of the present invention is easy to install and may be moved from one location to another.

THE DRAWINGS

FIG. 1 is a side view of the vehicle lift of the present invention, with certain portions being shown in cross section.

FIG. 2 is a top view of the vehicle lift of the present invention.

FIG. 3 is a sectional view taken along line 3—3 of FIG. 2.

FIG. 4 is a front end view of the vehicle lift shown in FIG. 2.

FIG. 5 is a bottom view of a portion of the platform of the vehicle lift of the present invention.

FIG. 6 is a sectional view taken along line 6—6 of FIG. 5.

FIG. 7 is a sectional assembly view taken along line 7—7 of FIG. 5. de

DESCRIPTION OF THE PREFERRED EMBODIMENT

As shown in FIGS. 1 and 3, the vehicle lift of the present invention is especially suitable for use in connection with loading dock 10, which is elevated by a wall 12 above a substantially flat, paved area 14. The lift is designed to allow installation on or flush with flat ground surface, rather than in a cavity or pit below the surface.

The lift generally comprises a reinforced rectangular platform 16 having one or a forward end located adjacent to the loading dock 10 and the other or rear end being connected by a pivot or transverse hinge 18 to the ground or paved area 14. Support means, hereinafter described, are combined with lifting means to raise the forward end of the platform upwardly around the hinge 18. It may be seen in FIG. 3 that the hinge 18 is located entirely beneath the platform 16 near the rear edge thereof in order to prevent contamination and possible damage. A separate inclined ramp 20 is secured to the ground ajacent the rear edge of the platform 16 coextensive with the width thereof to facilitate passage of the rear wheels of a trailer up onto the platform.

As best shown in FIGS. 1, 2, 3 and 4, the forward end of platform 16 includes an L-shaped bracket 22 having one leg secured to and extending horizontally forwardly of the lower surface of the platform, flush with said surface. The other leg of bracket 22 extends vertically upwardly and defines a partial recess with the front end of the platform. A hollow rectangular transverse support beam 28 is carried in the recess and is secured to the bracket 22 and across the entire width of the platform 16.

Upright, hollow support members or legs 30 and 32 are disposed on opposite sides near the forward edge of platform 16. Lower portions of the support legs 30 and 32 are secured to the opposite ends of the beam 28 and L-shaped bracket 22. Thus, the platform 16, bracket 22, horizontal beam 28, and upright legs 30 and 32 form a unitary, integrated structure.

Means are connected to the upright legs 30 and 32 for raising and lowering the forward end of the platform. As shown in FIGS. 1 and 4, a hydraulic cylinder 34 is mounted within each leg 30 and 32. The upper end of the cylinder 34 is pivotally connected by a clevis 36 to the upper portion of the leg. The lower end of the cylinder 34 is pivotally connected to a pad 38 secured to the ground 14. The cylinders 34 are provided with a regulated supply of pressurized hydraulic fluid from a conventional source or power unit, shown generally at 40, through lines 42 (FIG. 4) leading to the cylinders.

Mounting of the power cylinders 34 in an upright position and within the legs offers several advantages. The cylinders, being completely enclosed, are protected from the elements and are also protected from dents, which might otherwise render the cylinders inoperative in a short period. Also, the cylinders are located and oriented in a position to perform the most efficient work, and are contained vertically in the integrated structure.

The platform 16 is of special construction so as to be thin as possible, since the entire platform structure is located above ground level. The top of the platform must not be so high above ground level to prevent easy access by means of a ramp. Preferably, the top of the platform is less than 8 to 10 inches above ground level. This, in turn, requires a special reinforcement structure for the platform which is extremely thin and yet capable of withstanding the considerable loads and bending forces encountered in service.

As shown in FIG. 2, the platform is preferably provided in two prefabricated sections 44 and 46, which are secured along the longitudinal centerline at 48. The use of the sections 44 and 46 facilitates shipping and on-site assembly.

Each section, as shown in FIGS. 5, 6 and 7 comprises a continuous upper plate 50. A plurality of upwardly facing channels, such as 52 and 54 in FIGS. 5 and 6, extend longitudinally below the upper plate 50 and have upwardly facing lips secured to the lower surface of the plate 50. The channels 52 and 54 are secured to the plate 50 in a spaced relationship, and a plurality of elongated cover strips, such as 56 are secured between adjacent channels to complete the bottom wall.

The resulting structure is in effect a sandwich construction having an upper and lower walls, and a plurality of vertical ribs extending longitudinally and connected between the upper and lower walls. The structure is especially resistant to bending and offers a minimum of thickness per unit of surface area of the platform. To provide a usable minimum thickness for the required surface area, the apparatus of the present invention requires that the ratio of platform thickness to surface area to be less than 0.0003.

Furthermore with regard to the platform, another important feature is the method by which the platform sections 44 and 46 may be joined in the field. The sections 44 and 46 are joined by a plurality of longitudinally spaced rectangular tube sections, such as 58a, 58b and 58c (FIG. 5), which are open upwardly prior to final assembly. The tubes, as shown in FIG. 7, are previously joined to one of the platform sections 46. This enables a welding torch to be inserted around the open tubes to weld them to the bottom portions of the other platform section 44, such that it is not necessary to turn the heavy platform over during field assembly. The tubes 58 are eventually covered with plates, such as 60, extending the length of the platform, in order to complete the assembly.

As shown in FIGS. 1 and 2, a triangular skirt 70 may be supported on both sides of the apparatus closely adjacent the side edges of the platform. The skirts are anchored to the ground and are inclined upwardly toward the front end of the platform. The skirts are safety devices and prevent objects and people from entering beneath the platform after it has been raised.

The operation of the apparatus will now be apparent. Pressurized hydraulic fluid is supplied to the opposed cylinders 34 causing them to expand. In so doing, the legs 30 and 32, beam 28 and forward end of platform 16 are elevated toward the position shown in dotted lines in FIG. 3. It will be seen that as the forward end of the platform is raised, it rotates around the axis of the hinge 18.

In a typical application, a trailer would be backed up the ramp 20 onto the lowered platform. The platform would then be raised for an appropriate distance until the bed of the trailer was level with the dock 10. After the trailer is loaded or unloaded, the platform is lowered back to its original position so that the vehicle may be removed.

In view of the downward forces imposed by the vehicle and weight of the platform against the upward force of the cylinders, the use of the reinforcing yoke arrangement, i.e., members 22, 28, 30 and 32, is highly important to the success of the present invention. At the same time, however, there are practical limits on the overall vertical thickness of the transverse beam support. Although beam 28 could in theory, extend below the level of the platform, this would cause the platform to be upwardly inclined in its lowermost position and would limit its available degree of travel. A possible solution would be to provide a cavity in the pavement to accommodate the beam, but this would add greatly to the cost of installation.

In view of the foregoing, it is desirable to have the beam 28 or equivalent structure extend above the upper surface of the platform. There is, however, a practical limit on the allowable extension of the beam above the platform. Vehicles to be raised on the platform comprise many variables, such as wheel sizes and location of the wheels relative to the back end of the truck. Also, many vehicles have protective bars and the like, which are suspended below the body at the back of the truck. As the vehicle is being lifted, the beam 28 could rotate toward and come into contact with lower portions of the vehicle.

In order to minimize the aforesaid undesirable contact, the beam 28 or other support structure at the front of the platform should extend less than 12 inches above the top of the platform. Also, as illustrated, while the beam is by necessity thicker than the platform, a portion of such thickness is accommodated by securing the beam against the forward edge of the platform.

I claim:

1. A ground supported vehicle lift apparatus comprising a platform means for supporting the wheels of a vehicle, said platform means having first and second opposite ends, a hinge connected between the ground and the second end of the platform, a transverse support beam secured across the platform at the first end thereof, a pair of upright support beams disposed on the sides of the platform at the first end thereof and secured to the transverse support beam, and power cylinder means connected between respective upright members and the ground for raising and lowering the first end of said platform relative to the ground, the entire apparatus being located above ground level.

2. The apparatus of claim 1 wherein said power cylinder means are located within said upright support beams.

3. The apparatus of claim 2 wherein each power cylinder means is pivotally connected to said upright support beam and to said ground.

4. The apparatus of claim 1 wherein said platform means has an upper wall, and said hinge is located beneath said wall.

5. The apparatus of claim 1 wherein said platform means comprises top and bottom walls, and a plurality of spaced ribs connected between said walls.

6. The apparatus of claim 5 wherein said ribs extend longitudinally between the first and second ends of the platform means.

7. The apparatus of claim 6 wherein said upper wall has an exposed surface area, and wherein the ratio to the thickness of said platform means to said surface area is less than 0.0003.

8. The apparatus of claim 1 wherein the transverse beam is supported by an L-shaped bracket extending from the front edge of the platform.

9. The apparatus of claim 1 wherein said transverse support beam is thicker than said platform means.

10. The apparatus of claim 9 wherein said platform means has an upper surface, and said transverse beam extends less than 12 inches above said surface.

11. The apparatus of claim 1 wherein the first end of the platform means is located adjacent a raised dock.

12. The apparatus of claim 1 wherein said platform means comprises a pair of prefabricated sections, and a plurality of spaced rectangular members joining said sections.

13. The apparatus of claim 1 wherein a ramp is provided to said platform adjacent said second end.

14. A ground supported lift apparatus for lifting one end of a vehicle, said apparatus comprising a platform having opposite ends, means including a plurality of ribs for supporting said platform means for pivotally connecting the platform to the ground at one end, a U-shaped support yoke at the other end of the platform, said yoke having a portion thereof secured to said other end and a pair of upstanding legs, and power cylinder means connected between the upper portion of said legs and said ground for raising and lowering said yoke and the associated end of the platform, said platform being located above ground level.

15. A ground supported vehicle lift apparatus comprising platform means for supporting the wheels of a vehicle, said platform means having first and second opposite ends, a hinge connected between the ground and the second end of the platform, a support beam secured across the platform at the first end thereof, a pair of upright members disposed on the sides of the platform at the first end thereof and secured to the support beam, means connected between the respective upright members and the ground for raising and lowering the first end of said platform relative to the ground, the entire apparatus being located above ground level, and said platform means comprising a pair of prefabricated sections, and a plurality of spaced rectangular members joining said sections.

16. A ground supported vehicle lift apparatus comprising a platform means for supporting the wheels of a vehicle, said platform means comprising an upper wall, a lower wall, and a plurality of reinforcing ribs secured between the upper and lower walls, a transverse support beam secured across one end of the platform, an upright support member secured to said beam, and power cylinder means connected between said ground and said upright member for raising and lowering said one end of said platform, said entire apparatus being located above ground level.

* * * * *